(No Model.)

W. FOTH.
CLAMP FOR REPAIRING BICYCLE TIRES.

No. 568,753.   Patented Oct. 6, 1896.

Attest:
L. Lee.
Edw. F. Kinsey.

Inventor.
William Foth, per
Thomas S. Crane, Atty.

UNITED STATES PATENT OFFICE.

WILLIAM FOTH, OF ORANGE, NEW JERSEY.

CLAMP FOR REPAIRING BICYCLE-TIRES.

SPECIFICATION forming part of Letters Patent No. 568,753, dated October 6, 1896.

Application filed December 14, 1895. Serial No. 572,122. (No model.)

*To all whom it may concern:*

Be it known that I, WILLIAM FOTH, a citizen of the United States, residing at Orange, Essex county, New Jersey, have invented certain new and useful Improvements in Clamps for Repairing Bicycle-Tires and Similar Articles, fully described and represented in the following specification and the accompanying drawings, forming a part of the same.

The object of this invention is to prevent the formation of a protuberance upon a bicycle single-tube tire when repaired by inserting a plug and inflating the tire with compressed air. A puncture in such tires is commonly repaired by forcing a plug (having a head with cement applied thereto) through the puncture until the head of the plug expands upon the inner surface of the tire, air then being pumped into the tire to press such head upon the inner surface until the cement is set or hardened. At the close of such operation it has been common to find a protuberance around such plug caused by the yielding of the tire in the vicinity of the puncture, due to the straining of the rubber tire around the puncture under the pressure of the contained air, and the stem of the plug is usually cut off even with the top of such protuberance, leaving an unsightly projection upon the tire.

The present invention consists of a clamp adapted to sustain the tire immediately around the plug during the hardening of the cement after a plug is applied.

In the simplest form the clamp consists of a metallic strap with a perforation adapted to fit closely about the plug and provided with means for holding it tightly upon the tire. The clamp may also be made in other forms, as is illustrated in the annexed drawings, in which—

Figure 1 represents the perforated clamping-band with a notched strap attached to one end. Fig. 2 is a view of a similar band with a plug affixed upon one end and a chain attached to the other. Fig. 3 is an end view of such band, showing the projection of the plug. Fig. 4 is a cross-section of a wheel rim and tire, showing the application of the strap illustrated in Fig. 2. Fig. 5 is a cross-section of a wheel rim and tire, illustrating the application of the clamp-band shown in Fig. 1. Fig. 6 is a section of the tire through the plug when cemented therein with the use of my tire-clamp, and Fig. 7 is a cross-section of a wheel rim and tire with a gooseneck clamp applied thereto.

Figs. 1 to 5 show the clamp formed of a band of thin sheet metal A and provided with a graduated series of five holes B, adapted to fit snugly upon the shank C of repair-plugs of various sizes.

In Figs. 4, 5, and 7 plugs of three different sizes are represented inserted in the tire F, with the head *c* upon the inner side and the shank projected outwardly, in the manner in which it is usually drawn by the fingers before inflating the tire. The tire is represented upon the wheel-rim G, as repairs in single-tube tires can be made with such adhesive studs without removing them from the wheel.

One end of the band in Fig. 1 is shown with a transverse slot D and the opposite end of the band with an integral tongue or strap E, provided with teeth *e* upon one edge. Such band is used, as shown in Fig. 5, by wrapping it about the tire and wheel-rim, projecting the strap through the slot, and engaging one of the teeth *e* with the sheet metal at the edge of the slot when the band is sufficiently tight upon the tire to retain such engagement. The tire is then inflated with compressed air, which presses the head *c* of the plug firmly against the interior of the tire, and thus holds it while the cement hardens, which occupies fifteen minutes, more or less. During such elastic pressure of the air the body of the tire around the stud is fully sustained by the clamping-band A, and the tire is thus prevented from bulging outwardly in the manner heretofore common. The head being thus firmly secured to the inner side of the tire, the shank of the rivet may be cut off flush with the surface, as shown in Fig. 6, in the usual manner.

The tire exhibits no prominence around the repair for the reasons just stated, but presents the same appearance as before it was repaired.

Figure 1:
Figures 2, 3:
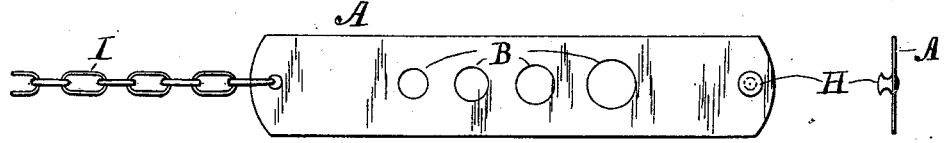
Fig. 2 shows the band with a graduated series of four holes, a stud H, projected from the surface of the band at one end, and a chain I, attached to the other end of the band with links adapted to engage such stud.
Figure 4:
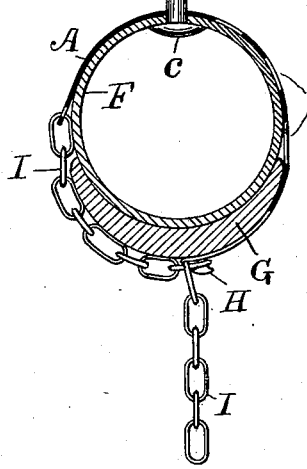
Fig. 4 shows the application of such a repairing-clamp to the tire and wheel-rim, the band being shown in section, with the smallest hole applied to the shank C of the plug and the chain engaged with the stud H to hold the clamp in place while the tire is inflated.
Figure 7:
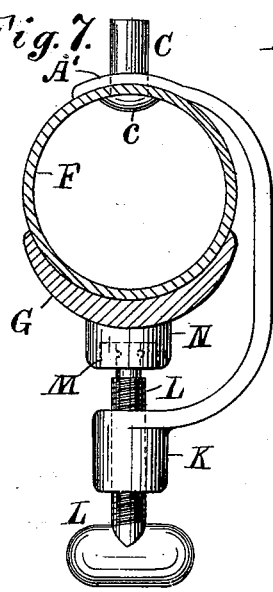
Figure 5:
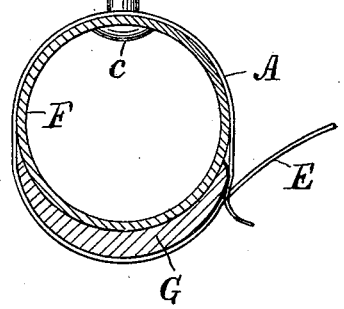
Figure 6:
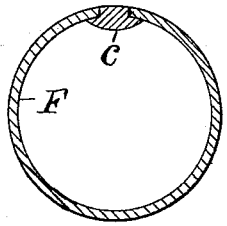

Fig. 7 shows a single rigid bar J, bent into gooseneck shape, one end being curved to form the clamp A', which is shown applied to the top of the tire F, with the plug C projected from the same, and the other end furnished with a nut K, through which a set-screw L is projected, and furnished with a swiveling head-piece M, coated with india-rubber N, to press upon the under side of the rim G, as shown.

If desired, the tongue or strap E may be made separate from the band A and riveted loosely upon the end of the same to form a hinge-joint like that in the middle of a fourfold carpenter's rule, by which construction the strap can be turned to lie over the surface of the band and the entire device thus occupy less room in packing or transportation.

It is obvious that the device may be used to sustain the internal pressure upon a hose or any other object analogous to a pneumatic tire where it is necessary to insert a plug to repair a puncture, and I do not therefore limit myself exclusively to the use of the device upon pneumatic tires.

Having thus set forth the nature of my invention, what I claim herein is—

1. A tire-repairing clamp, provided with an aperture to embrace the shank of a repair-plug and provided with means for holding it upon the tire during the inflation of the same, substantially as herein set forth.

2. A tire-repairing clamp, consisting of a flexible band formed with a hole to embrace the shank of a repair-plug and provided with means for holding it upon the tire, as herein set forth.

3. A tire-repairing clamp, consisting of a flexible band formed with a graduated series of holes to fit repair-plugs of different sizes, and provided with means for holding it upon the tire, as set forth.

4. A tire-repairing clamp, consisting of a flexible band formed with a graduated series of holes, and having at one end a strap provided with a series of teeth, and at the opposite end a hole to insert the strap and adapted to engage the said teeth, substantially as herein set forth.

In testimony whereof I have hereunto set my hand in the presence of two subscribing witnesses.

WILLIAM FOTH.

Witnesses:
E. W. CRANE,
THOMAS S. CRANE.